(12) United States Patent
Olson et al.

(10) Patent No.: US 9,918,596 B2
(45) Date of Patent: Mar. 20, 2018

(54) PARTITIONABLE PAPER PRODUCT

(71) Applicant: GPCP IP Holdings LLC, Atlanta, GA (US)

(72) Inventors: Steven R. Olson, Menasha, WI (US); David A. Hoadley, Hortonville, WI (US); Thomas J. Daul, Oneida, WI (US)

(73) Assignee: GPCP IP Holdings LLC, Atlanta, GA (US)

( * ) Notice: Subject to any disclaimer, the term of this patent is extended or adjusted under 35 U.S.C. 154(b) by 0 days.

(21) Appl. No.: 15/162,161

(22) Filed: May 23, 2016

(65) Prior Publication Data

US 2016/0345761 A1    Dec. 1, 2016

Related U.S. Application Data

(60) Provisional application No. 62/166,488, filed on May 26, 2015.

(51) Int. Cl.
| | | |
|---|---|---|
| A47K 10/16 | (2006.01) | |
| D21H 27/00 | (2006.01) | |
| B65H 18/28 | (2006.01) | |
| A47G 11/00 | (2006.01) | |

(52) U.S. Cl.
CPC .......... *A47K 10/16* (2013.01); *A47G 11/001* (2013.01); *B65H 18/28* (2013.01); *D21H 27/002* (2013.01)

(58) Field of Classification Search
CPC .......... Y10T 428/15; Y10T 428/24273; A47K 10/16; B65H 18/28; B65H 2701/1924; D21H 27/002; B31F 1/07; B31F 2201/0797; D21F 11/008
See application file for complete search history.

(56) References Cited

U.S. PATENT DOCUMENTS

| | | | |
|---|---|---|---|
| 8,097,322 B1 | 1/2012 | Osorio | |
| 8,119,223 B2 | 2/2012 | Morin et al. | |
| 8,268,429 B2 * | 9/2012 | McNeil | A47K 10/16 162/114 |
| 8,283,013 B2 * | 10/2012 | Feldmann | B26F 1/22 162/114 |
| 8,287,976 B2 * | 10/2012 | Hupp | B32B 3/10 162/114 |
| 8,287,977 B2 * | 10/2012 | McNeil | A47K 10/16 162/114 |

(Continued)

FOREIGN PATENT DOCUMENTS

| | | |
|---|---|---|
| CA | 873735 | 6/1971 |
| CN | 202665404 U | 1/2013 |

(Continued)

OTHER PUBLICATIONS

Written Opinion and International Search Report, issued by International Searching Authority, Application No. PCT/US2016/033918, dated Aug. 31, 2016.

(Continued)

*Primary Examiner* — Jose A Fortuna
(74) *Attorney, Agent, or Firm* — Laura L. Bozek (57) ABSTRACT

The present disclosure is directed to a paper towel product that will capably separate from the paper towel roll as a full sheet, a half sheet or a quarter sheet. A method of making a paper towel with machine direction perforations is also disclosed.

8 Claims, 5 Drawing Sheets

(56) References Cited

U.S. PATENT DOCUMENTS

| | | | |
|---|---|---|---|
| 8,443,725 B2* | 5/2013 | McNeil | B26F 1/26 101/24 |
| 8,468,938 B2* | 6/2013 | Redd | B26F 1/20 101/24 |
| 8,535,483 B2* | 9/2013 | McNeil | D21F 11/008 162/286 |
| 8,741,410 B2 | 6/2014 | Cattacin et al. | |
| 8,757,058 B2* | 6/2014 | Kien | B26F 1/22 101/23 |
| 8,763,523 B2* | 7/2014 | McNeil | B26D 7/20 101/23 |
| 8,763,526 B2* | 7/2014 | McNeil | B26F 1/10 101/219 |
| 9,259,848 B2* | 2/2016 | Hupp | B65H 35/08 |
| 2006/0273099 A1 | 12/2006 | Oday et al. | |
| 2007/0044928 A1 | 3/2007 | Shannon et al. | |
| 2011/0308363 A1* | 12/2011 | Kien | B26F 1/22 83/22 |
| 2011/0308366 A1* | 12/2011 | Redd | B26F 1/20 83/169 |
| 2011/0308370 A1* | 12/2011 | Hupp | B26D 7/20 83/665 |
| 2011/0308372 A1* | 12/2011 | McNeil | B26D 7/20 83/886 |
| 2011/0308405 A1* | 12/2011 | McNeil | B26F 1/10 101/24 |
| 2011/0308406 A1* | 12/2011 | McNeil | B41J 3/407 101/32 |
| 2011/0308754 A1* | 12/2011 | McNeil | D21F 11/008 162/286 |
| 2011/0309544 A1* | 12/2011 | Hupp | B65H 35/08 264/156 |
| 2011/0311748 A1* | 12/2011 | Hupp | B32B 3/10 428/43 |
| 2011/0311749 A1* | 12/2011 | McNeil | A47K 10/16 428/43 |
| 2011/0311750 A1* | 12/2011 | McNeil | A47K 10/16 428/43 |
| 2011/0311751 A1* | 12/2011 | Feldmann | B26F 1/22 428/43 |
| 2013/0040089 A1 | 2/2013 | Cattacin et al. | |
| 2013/0193248 A1* | 8/2013 | Orozco Ramirez | B65H 18/28 242/160.1 |
| 2013/0193249 A1* | 8/2013 | Orozco Ramirez | B65H 18/28 242/160.1 |
| 2014/0345815 A1* | 11/2014 | Hammen | D21H 27/002 162/125 |
| 2014/0370224 A1* | 12/2014 | Kien | B26F 1/14 428/43 |
| 2016/0345761 A1* | 12/2016 | Olson | B65H 18/28 |
| 2016/0345786 A1* | 12/2016 | Olson | B65H 18/28 |

FOREIGN PATENT DOCUMENTS

| | | |
|---|---|---|
| JP | 2006247311 A | 9/2006 |
| WO | 03026472 A1 | 4/2003 |

OTHER PUBLICATIONS

English machine translation of JP 2006247311, published Sep. 21, 2006.
English machine translation of CN 202665404, published Jan. 16, 2013.
English translation of JP 2006247311, 9 pgs.
English translation of CN 202665404, 6 pgs.

* cited by examiner

PARTITIONABLE PAPER PRODUCT

CROSS-REFERENCE TO RELATED APPLICATIONS

This application is based on U.S. provisional patent application No. 62/166,488, filed May 26, 2015, which is incorporated herein in its entirety.

DESCRIPTION

The present disclosure relates to a paper product that can be partitioned into sheet sizes demanded by consumer preference. Specifically, the present disclosure describes a paper product that can be perforated in both the machine direction and the cross machine direction to allow for the separation of the paper web in new and different ways. For example, the bi-directional perforation opens new options for packaging, folding and dispensing web products. Moreover, the present disclosure provides a solution for minimizing waste when using consumer paper products by creating integral sizing allowing the consumer to remove only the amount of paper product that is desired for the particular use. In one embodiment, the present disclosure describes a rolled paper towel product that allows not only the separation of a single sheet from the roll, but the separation of a half sheet and a quarter sheet.

The consumer's daily life is filled with a variety of modern products that are produced solely for the comfort and convenience of the consumer. While consumer demand for disposable products is high, many consumers remain concerned about the level of resources that are required to produce these disposable products. Thus, there continues to be significant work to develop disposable products that are as environmentally friendly as possible.

Environmentally conscience consumers often seek out products that allow them to use less disposable material. In the area of paper towels, this has spurred manufacturers to offer paper towel products with smaller profiles to handle smaller jobs. These towels are marketed under monikers such as "Select-a-Size" or "Pick-a-Size." While the concept of providing the consumer with the ability to separate their paper products into smaller squares would seem apparent, providing a product that can actually be further partitioned is very difficult. In the area of napkins, consumers can save waste by purchasing the napkins that are appropriate for their desired use. The industry routinely sizes napkins by the job they are intended for, including cocktail napkins, luncheon napkins, dinner napkins, and the myriad of fast food sizes.

Current towel products on the market have a feature allowing the consumer to select between a full size paper towel product and a half size paper towel product. These products all use perforation lines that run from the top of the roll to the bottom of the roll, i.e., in the cross-machine direction (CD) of the towel sheet. Pick-a-size perforations are produced in the same fashion as standard perforations, but the perforation lines are more frequent and closer together. The addition of pick-a-size perforations has only minimal impact on the process for making the towel product.

By contrast, providing perforations in the machine direction (MD) of the sheet, e.g., around the center of the paper towel roll, or along a napkin fold line, as described herein, can have a substantial impact on the process for producing the paper sheet. Furthermore, current napkin products do not include perforations or any other means for the consumer to reduce the size of the product. If the consumer desires a different size napkin, they need to purchase another size. Given the current folding structures for napkins, creating a product that can be partitioned provides any number of difficulties.

This inability for the consumer, either industrial or commercial, to reduce the size of these convenience products extends to other common paper products, for example, wipers, folded hand towels, deli paper, coffee filters, dryer sheets, flower wraps, food liners, health care wipers to name a few. These products may be sold in different sizes, but they are generally sold in packages that contain only a single size of the product. If additional sizes are desired, they are purchased separately. A product which is capable of separation into smaller units would fulfill many of the consumer's desires to reduce the amount of environmental waste that they create.

What all of these products have in common is that they begin with a fibrous web that is subsequently converted into an end product. In its most basic description, paper, in this example, a paper towel, is made by feeding fiber dispersed in water into a paper machine, depositing the fiber onto a system of fabrics to form a sheet and drying the sheet. Modern paper machines can run at speeds in excess of 1000 M/minute, so care is taken not to introduce weaknesses into the sheet prior to winding the sheet onto a roll, thereby avoiding breakage. A paper sheet inherently has different strengths in different directions. The paper sheet is stronger in the machine direction, i.e., around the roll, and weaker in the cross direction, i.e., from the top to the bottom of the roll.

Once the sheet is rolled up, it awaits a converting operation, i.e., a process to turn the raw paper web into a final product. Converting, like papermaking, is a high throughput process that should be controlled to prevent breaking of the paper sheet as it is moved through the process toward a final product. During converting, weaknesses in the sheet may be introduced by the converting processes themselves, e.g., by embossing or perforating.

The inventors have discovered an effective method for producing a paper product that has perforations in the machine direction and embodiments that have perforations in both the cross-machine direction and in the machine direction. This process allows a paper product to be produced, without failure during converting, as has been associated with prior art attempts to include machine direction perforations. The machine direction and bi-directional perforations also open new options for packaging, folding and dispensing web products.

In today's commercial market, it is not enough that one can produce a product having machine direction perforations. To be commercially acceptable, the product must meet consumer expectations. The inventors have further discovered that machine direction perforation can be created that will capably separate, whether it be a paper towel from the roll as a full sheet, a half sheet or a quarter sheet, or a wiper from a center pull container. To be effective, machine direction perforations should reliably separate into smaller products, and will, if certain characteristics and/or tear strengths are employed.

A better understanding of the various disclosed system and method embodiments can be obtained when the following detailed description is considered in conjunction with the drawings.

DETAILED DESCRIPTION

The following discussion is directed to various embodiments of the invention. The drawing figures are not necessarily to scale. Certain features of the embodiments may be shown exaggerated in scale or in somewhat schematic form and some details of conventional elements may not be shown in the interest of clarity and conciseness. Although one or more of these embodiments may be preferred, the embodiments disclosed should not be interpreted, or otherwise used, as limiting the scope of the disclosure, including the claims. It is to be fully recognized that the different teachings of the embodiments discussed below may be employed separately or in any suitable combination to produce desired results. In addition, one skilled in the art will understand that the following description has broad application, and the discussion of any embodiment is meant only to be exemplary of that embodiment, and not intended to suggest that the scope of the disclosure, including the claims, is limited to that embodiment.

Certain terms are used throughout the following description and claims to refer to particular features or components. As one skilled in the art will appreciate, different persons may refer to the same feature or component by different names. This document does not intend to distinguish between components or features that differ in name but not structure or function.

As used in the following discussion and in the claims, the terms "including" "is", "comprising", "containing", etc. are used in an open-ended fashion, and thus, should be interpreted to mean "including, but not limited to." If closed language is included, "consisting," and "consisting essentially of" it will be given its art recognized meaning.

As used herein "paper web," "continuous paper web," "paper roll," "rolled paper," "paper sheet," "sheet," "continuous sheet," "airlaid web," "airlaid," "nonwoven web," and "wiper," and "paper" all refer to the paper web that is subject to conversion into a final product.

As used herein "perforation" refers to the combination of one cut and one bond area.

As used herein "perforations" and "perforation line" are used interchangeably to describe a series of perforations that extends between any two points on the product, for example, a line of perforations that extends between two edges of the product, or a line of perforations that extends between an edge of the product and an intersecting perforation line.

As used herein "perpendicular," and "substantially perpendicular," are used interchangeably to describe a perforation line that generally follows the machine direction. Whether or not the term substantially is present as a modifier, the perpendicular perforation is understood to refer to a set of perforations that generally follow the machine direction. In instances where the term "perpendicular" is intended to refer specifically to a 90 degree angle between the CD perforation line and the MD perforation line, it will be so specified.

In the production of disposable paper goods, a fibrous web is produced from fiber that has been liberated from a source material, for example, softwood or hardwood. The fibers are arranged into a continuous sheet material by any known papermaking process, for example, by wet pressing, through-air-drying or air-laying.

In the production of a kitchen towel, napkins or other products the products may be produced using a wet laying process. According to an exemplary wet laid process, paper products are made by feeding fiber dispersed in water into a paper machine, combining the fibers with the chemicals appropriate for the type of product being produced, e.g., wet strength resins for the production of a kitchen towel, depositing the fiber onto a system of fabrics to form a sheet and drying the sheet. Drying may be accomplished by any known papermaking process, for example, by Yankee dryer, through-air-drying, or any process using a structured drying fabric, including by way of example, the UCTAD process, the eTAD process, the Atmos process, and the like.

According to another well known process, fibrous base sheets can be made by air-laying fiber. According to this process, fibers are entrained in an air stream and collected on a condenser screen. The sheet deposited on the condenser screen can be bonded by any suitable method including, for example, mechanical bonding, e.g., needle punching, thermal bonding, chemical bonding, hydroentanglement, and the like. As with wet laid paper sheets, air-laid nonwovens are subjected to converting operations, that can range from simple to complex, to transform the base sheet into the desired end product. Such non-woven products can be packaged in art recognized packages, including for example, tubs, carbons, single packs, canisters, both rigid and flexible packages.

Regardless of the process by which it is made, every paper sheet inherently has different strengths in different directions. The paper sheet is stronger in the machine direction, i.e., around the roll, and weaker in the cross direction, i.e., from the top to the bottom of the roll. These strength differences can come into play during the process of converting the web to the final product. When additional stresses are added to the product that impact the weaker direction, the likelihood of failure during converting increases.

Figure 1:
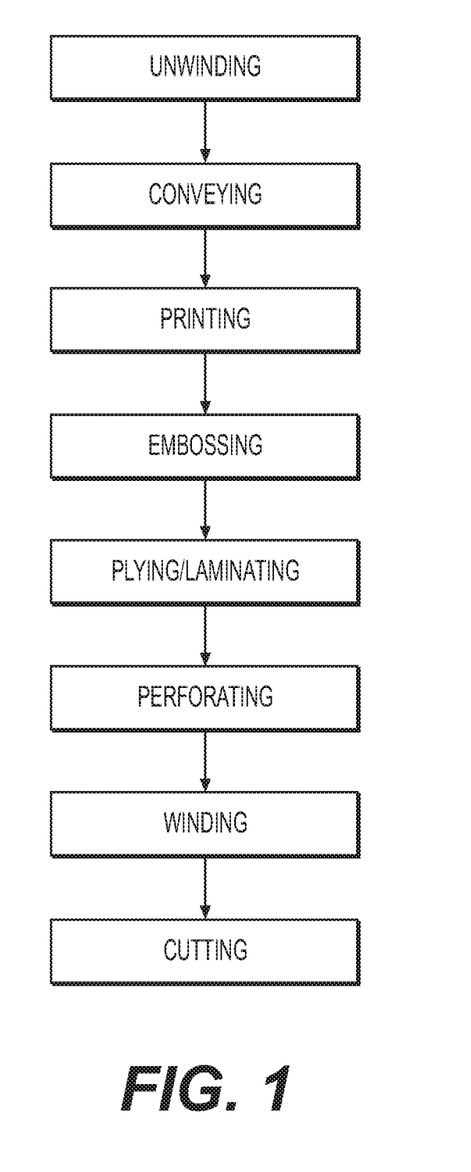
FIG. 1 is a flow diagram illustrating a general process for converting a paper web to a paper towel product herein.

Converting encompasses many different potential operations on the paper web including, for example, cutting, folding, embossing, slitting, perforating, plying, punching, laminating, chemically treating, and the like. Specific combinations of converting operations are well understood to produce certain end products, for example, paper towel rolls, napkins, facial tissue, etc. During a typical paper towel converting operation, the paper web is unwound, embossed, plied, perforated, rewound, and cut into individual paper towel rolls. During these (and any other) operations, the sheet is moved at high speeds between various pieces of converting equipment. An example paper towel converting operation is illustrated in FIG. 1. The paper sheet is moved between pieces of equipment under tension and each of these converting operations cause stress on the sheet as it moves.

Figure 2:
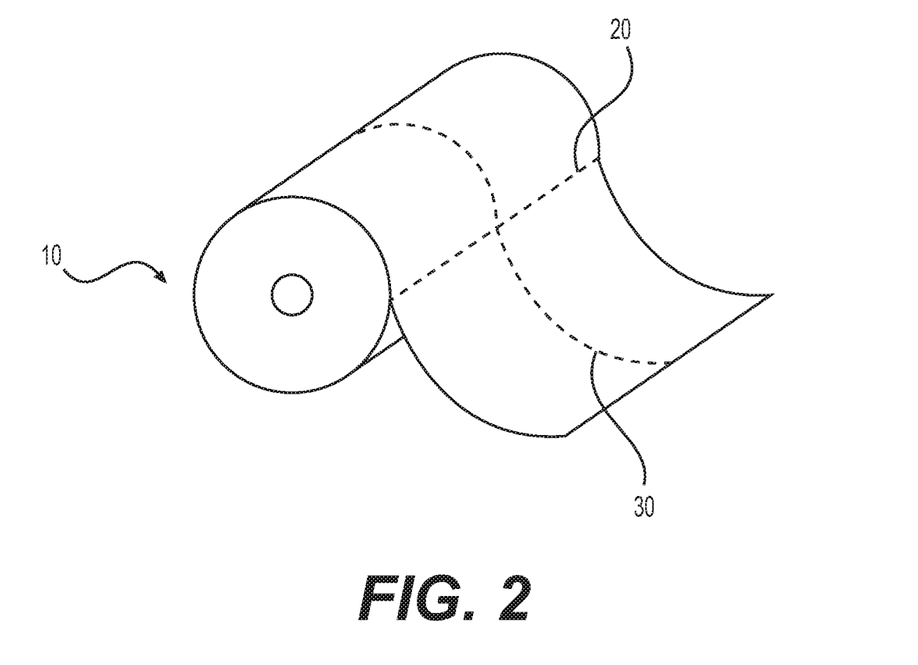
FIG. 2 illustrates a paper towel roll with perforations as described.

FIG. 2 illustrates a paper towel product 10 having perforation lines in the cross machine direction 20 and a perpendicular perforation line 30 in the machine direction. The paper towel product 10 can be produced using the converting sequence represented in FIG. 1. The paper sheet is unwound from a parent roll and conveyed through a printer, if the product is a printed product, otherwise, the paper sheet is conveyed to the embossing station where the sheet is embossed. After embossing, if the product is a multi-ply product, the sheet is plied and laminated before it is conveyed to perforating. After the product is perforated, it is wound into logs of an appropriate commercial diameter. The logs are subsequently cut into individual rolls which are packaged and ready for sale.

Figure 4:
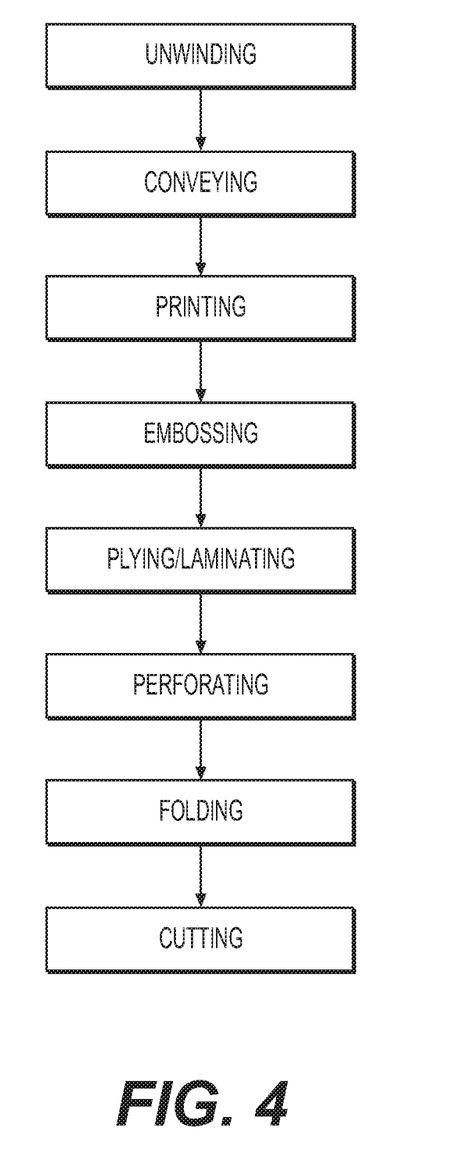
FIG. 4 is a flow diagram illustrating a general process for converting a paper web to a perforated napkin product.

During a typical napkin converting operation, the paper web is unwound, embossed, plied, folded, and cut into individual paper napkins. As with paper towels, during these operations the sheet is moved at high speeds between various pieces of converting equipment. An exemplary napkin converting operation according to the present disclosure is illustrated in FIG. 4. Unlike prior napkin converting processes, the process and system as described herein include a perforating step prior to the folding and cutting of the napkin product. The perforating process provides a napkin product that can be divided into two equivalent napkins. According to one embodiment, the perforation will fall on the last fold made in the napkin.

Figure 5:
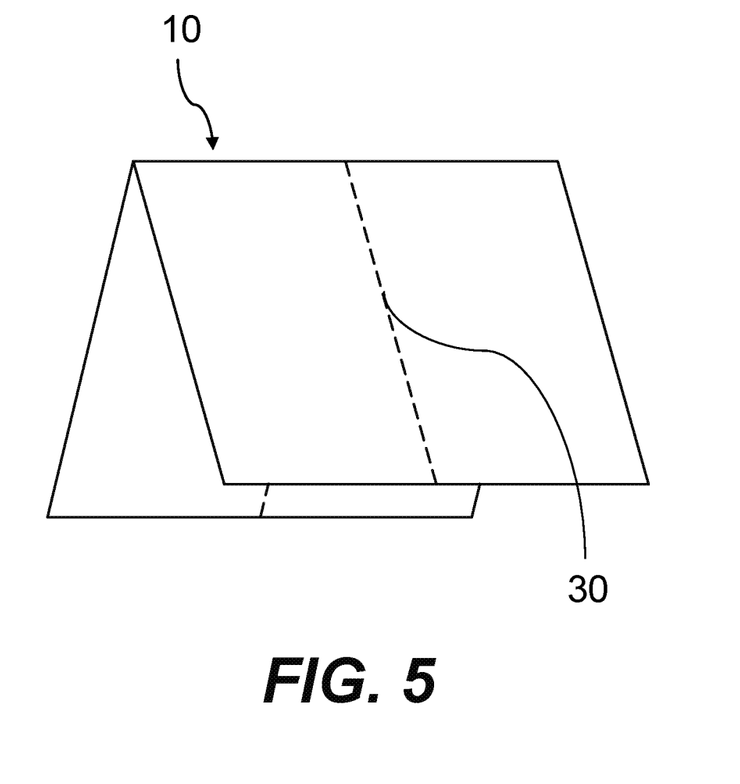
FIG. 5 illustrates a napkin product having a machine direction perforation that will coincide with the fold line of the final napkin product.

FIG. 5 illustrates a napkin product 10 having perforation lines in the machine direction 30. The napkin product 10 can be produced using the converting sequence represented in FIG. 4. The paper sheet is unwound from the parent roll and conveyed through a printer, if the product is a printed product, otherwise, the paper sheet is conveyed to the embossing station where the sheet is embossed. After embossing, if the product is a multi-ply product, the sheet is plied and laminated before it is conveyed to perforating. After the product is perforated, it is sent to a folding machine where the paper is folded and cut into individual napkin products.

In addition to the inherent stresses that are put on the sheet due to the movement between converting operations, embossing and perforating create other stresses that can also weaken the sheet providing points at which the converting operation can fail due to sheet separation or breakage.

Each perforation line includes a series of individual perforations. One perforation is made up of one cut made through the paper and one bond. As used herein, bond refers to the tab of paper that remains attached between the individual cuts. So, each perforation is made up of one cut and the neighboring bond. The perforation can be defined below by the length of the cut, the length of the bond or the combined length of the two, referred to herein as perforation unit length.

Perforations in the products as described can be produced using any art recognized perforation systems. Perforation systems typically include one or more blades comprising a number of teeth. The teeth form the surface of the cutting blade that is used to cut the paper product and form the cut portion of the perforation. The open areas between the teeth on the blade move over the paper surface, without causing damage to the surface, and thereby creates the bond portion of the perforation. Perforation rolls for producing perforation lines in the CD direction generally have a series of perforation blades that begin at a first end of a perforating roll and span the diameter and length of the roll over one full rotation of the roll in a helical fashion. To produce perforations that run in the MD direction, a perforation roll was configured to have a series of blades made up of teeth and open spaces to produce the cuts and bonds of the perpendicular perforation line.

The paper towel product as described is produced to have perforation lines in both the cross machine direction, as well as perforation lines in the machine direction. According to one embodiment, the perforation lines on the paper product have a tear strength in the machine direction that is higher than the tear strength in the cross-machine direction.

According to one embodiment, the napkin product is perforated only the MD direction. These MD perforation lines have sufficient tear strength to prevent separation of the napkin sections until a tearing load is applied to the napkin to cause separation.

According to one embodiment, the wiper product is a center pull product and includes perforation lines in both the MD and CD directions. As with the paper towel products, the perforation lines on the wiper product may have a perforation tensile strength in the machine direction that is higher than the perforation tensile strength of the perforation line in the cross-machine direction to allow the product to be properly dispensed.

Paper Towels

The paper towel product as described is produced to have perforation lines in the cross machine direction, as well as, at least one perpendicular perforation line in the machine direction. Perforation lines in the CD direction are well understood in the art and can be made using any art recognized perforation blade(s). Typical perforation blades used to produce paper towel perforations in the CD direction produce perforation lines with a perforation tensile of between about 600 and about 950 g/3". One typical perforation blade used to produce commercial paper towel products has a perforation unit length from about 3.5 to about 3.9 mm, for example, about 3.7 mm, with 0.6 mm being the bond length, and 3.1 mm being the cut length.

Figure 3:
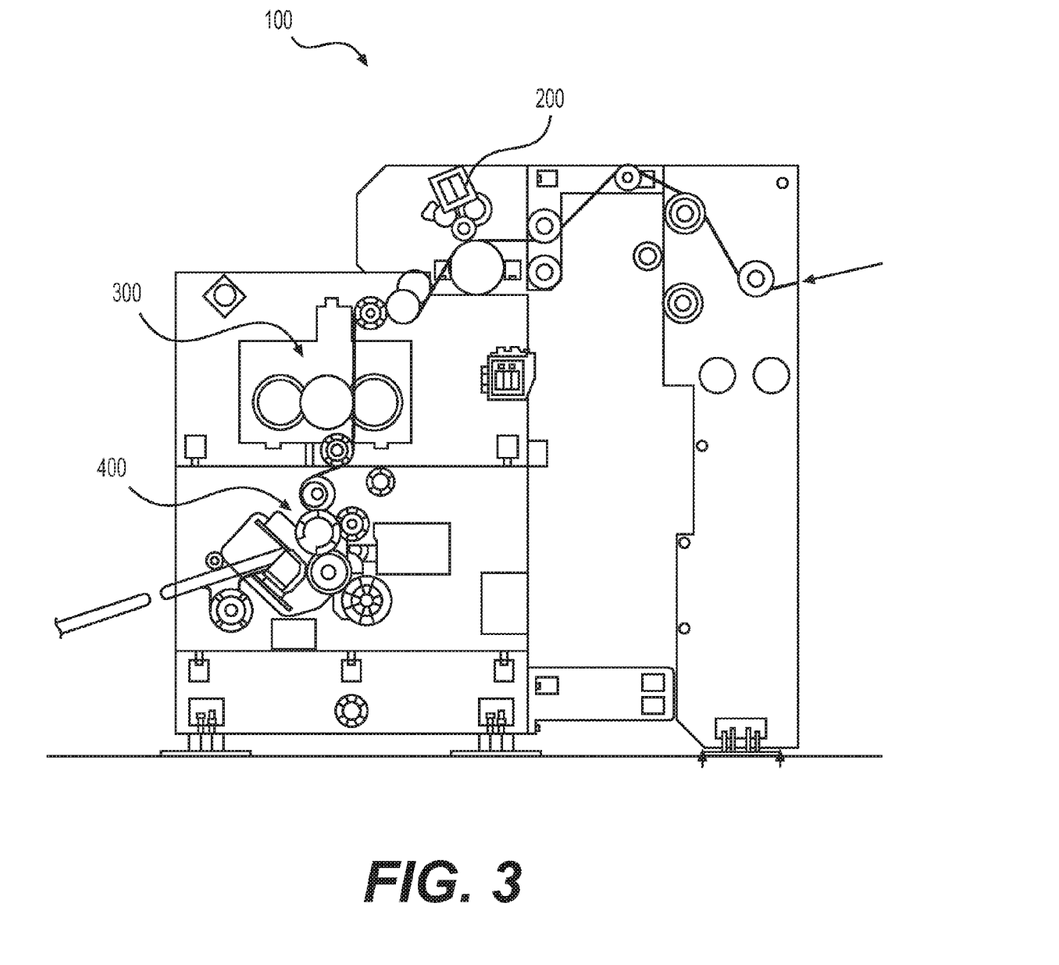
FIG. 3 illustrates one embodiment of a converting operation including a wheel for producing machine direction perforations.

Perpendicular perforation lines in the MD direction are produced by applying a perforation roll either before or after the perforation unit that produces CD perforations. One configuration for perforating a paper towel product is set forth in FIG. 3. According to one embodiment illustrated in FIG. 3, a rewinder 100 carries a paper web through an MD perforator wheel and anvil roll 200. The paper web is perforated in the MD direction creating a perpendicular perforation. The web is then directed between a helical CD perforation wheel and an anvil roll 300, where CD direction perforation are made the paper web. Finally, the paper web is wound to the diameter of the desired commercial product in the surface winder section 400.

Perforation rolls for use in the instant disclosure can include any art recognized perforation roll or a series of perforation wheels used in concert. The diameter of the perforation wheel is selected to produce the correct repeat length for the desired perforation unit length. Upon determining the desired perforation tensile, and perforation unit length, the skilled artisan can select an appropriate perforation wheel to generate the appropriate repeat length. According to one embodiment, the size of the corresponding anvil roll can be adjusted, usually to a greater diameter roll, to improve contact between the perforation wheels and the anvil surface, should it be desired when running at high speeds. According to one embodiment, typical perforation blades used to produce paper towel perforations in the MD direction produce perforation lines with a perforation tensile of between about 800 and about 1500 g/3". The perforation blade for producing the perpendicular perforation can have a perforation unit length of from about 3.0 mm to about 6.5 mm with the bond length being from about 0.5 mm to about 0.9 mm and the cut length being from about 2.0 mm to about 6.0.

According to one embodiment, the perforation lines in the cross machine direction have a percent bond area of the perforation line of at least about 15%, for example, at least about 16%, for example, between about 15.5% and about 16.5%, for example between about 16% and about 16.5%, for example between about 16% and about 16.3%.

The perpendicular perforation lines in the machine direction have a percent bond area of the perforation line of at least about 15%, for example, at least about between 15.5%, for example at least about 19%, for example at least about 22%, for example between about 15% and 30%.

According to one embodiment, the perforation lines in the cross machine direction have a perforation tensile of between about 450 g/3 inches and about 950 g/3 inches. More particularly, the perforation tensile is from about 450 g/3 inches to about 800 g/3 inches, for example, from about 500 g/3 inches to about 950 g/3 inches, for example, from about 600 g/3 inches to about 950 g/3 inches, for example, from about 750 g/3 inches to about 950 g/3 inches, for example, from about 850 g/3 inches to about 950 g/3 inches.

According to one embodiment, the perpendicular perforation lines in the machine direction have a perforation tensile of between about 770 g/3 inches and 1700 g/3 inches. More particularly, the perpendicular perforation tensile of the perpendicular perforations in the machine direction is from about 750 g/3 inches to about 1700 g/3 inches, for example, 800 g/3 inches to about 1700 g/3 inches, for example, from about 800 g/3 inches to about 1500 g/3 inches, for example, from about 950 g/3 inches to about 1700 g/3 inches. According to one embodiment, in order to achieve the proper separation sequence, the perforation strength of the perpendicular perforation in the MD direction is greater than the perforation in the CD direction.

The ratio of the perpendicular perforation tensile to the CD perforation tensile can be between about 0.9 and about 1.7, for example, between about 1.0 and between about 1.5, for example from about 1.0 to about 1.2.

According to one embodiment, the ratio between the perforation tensile strength of the perforation line in the CD direction and the MD tensile strength of the paper (CD perf tensile ratio) is from about 30% to about 40%, for example from about 32% to about 38%, for example, from about 32% to about 36%, for example, at least about 32%.

According to one embodiment, the ratio between the perforation tensile strength of the perpendicular perforation line in the MD direction and the CD tensile strength of the paper (MD perf tensile ratio) is from about 30% to about 60%, for example from about 30% to about 50%, for example, from about 32% to about 55%, for example, at least about 32%.

The ratio of the perpendicular perforation ratio to the perforation ratio can be between about 1.0 and about 2.0, for example, between about 1.0 and between about 1.8, for example from about 1.0 to about 1.7.

According to one embodiment, the bond length for the CD perforation line, measured linearly in the CD direction, is from about 0.5 mm to about 0.75 mm, for example, from about 0.5 mm to about 0.6 mm, for example, above about 0.5 mm, for example about 0.6 mm, for example between about 0.6 mm and about 0.7 mm.

According to one embodiment, the bond length for the MD perforation line, measured linearly in the MD direction, is from about 0.5 mm to about 0.9 mm, for example, from about 0.6 mm to about 0.9 mm, for example, above about 0.6 mm, for example from about 0.6 mm to about 0.8 mm, for example between about 0.65 mm and 0.8 mm.

According to one embodiment, the cut length for the CD perforation line, measured linearly in the CD direction, is from about 2.5 mm to about 3.5 mm, for example, from about 3.0 mm to about 3.5 mm, for example, above about 3.0 mm, for example about 3.1 mm, for example between about 3.0 mm and about 3.3 mm.

According to one embodiment, the cut length for the MD perforation line, measured linearly in the MD direction, is above about 2.0 mm, from about 2.0 mm to about 6.0 mm, for example, from about 2.5 mm to about 5.0 mm, for example, between about 2.0 mm and about 3.5, for example less than about 3.5 mm, for example between about 2.0 mm and about 4.5 mm.

While not exemplified, other embodiments are contemplated that achieve the desired relative perforation strengths between the machine direction perpendicular perforation line and the CD perforation line. While perforation lines are typically made up of a series of homogeneous perforations, irregular perforation lines are contemplated for use herein. The perforation line may be made up of different segments having varying perforation unit length, different bond lengths and/or different cut lengths. If one wanted to improve the strength of the MD perforation line in the area proximate the CD perforation line, one could use longer bonds for the MD perforations in the area proximate the intersection. As used herein, the area proximate the intersection of the CD perforation line and the MD perforation line refers to the area within about 4 mms of the point at which the two perforations cross.

According to one embodiment, the ratio of the cut lengths to the bond lengths for the CD perforation line, measured linearly in the CD direction, is greater than about 3, for example, greater than about 3.5, for example, greater than about 4, for example, greater than about 4.5, for example, greater than about 8.

According to one embodiment, the ratio of the cut lengths to the bond lengths for the perpendicular perforation line, measured linearly in the MD direction, is less than about 7, for example, less than about 5.0, for example, less than about 4, for example, less than about 3, for example less than about 2.5

According to one embodiment, the individual perforations of the perpendicular perforation line in the MD direction are longer than the individual perforations in the CD direction. According to another embodiment, the individual perforations of the perpendicular perforation line in the MD direction are shorter than the individual perforations in the CD direction. Finally, according to still another embodiment, the individual perforations of the perpendicular perforation line in the MD direction are the same length as the individual perforations in the CD direction and according to this embodiment, the cut and bond lengths in the MD perpendicular perforation line may be the same or different from the cut and bond lengths in the CD perforation line.

According to one embodiment, the ratio of the length of an individual perpendicular perforation in the MD direction to the length of an individual perforation in the CD direction is at least about 1.1, for example, at least about 1.2, for example, at least about 1.3, for example, at least about 1.4, for example, at least about 1.5, for example, at least about 1.6, for example, at least about 1.7, for example, at least about 1.9.

According to one embodiment, the perforations in the CD direction have smaller bonds than the perpendicular perforations in the MD direction. According to one embodiment, the bonds in the MD direction are 1.1 to 1.5 times the length of the bonds in the CD direction.

According to one embodiment, the cuts within the line of perforations make up at least about 50% of the area of the perforation line, for example, at least about 65% of the perforation line, for example, at least about 70% of the perforation line, for example, at least about 75% of the perforation line, for example, from about 65% to about 85%.

According to one embodiment the CD and MD perforations can be used to produce a towel product having a basis weight of at least about 35 g/sq. meter, for example, at least about 40 g/sq. meter, for example, at least about 43 g/sq. meter, for example at least about 45 g/sq. meter, for example, at least about 50 g/sq. meter. The basis weight of the paper web may affect the perforation tensile. More particularly, the towel product can have a basis weight of at least about 40 g/sq. meter, for example, at least about 43 g/sq. meter, for example, at least about 45 g/sq. meter, for example at least about 50 g/sq. meter, for example, at least about 51 g/sq. meter, for example between about 43 g/sq. meter and about 51 g/sq. meter.

According to one embodiment, the paper towel product is made from a paper web that is produced by non-compactive drying. Various method for non-compactive drying are well known in the art include through-air-drying (TAD), UCTAD (uncreped TAD), single or double creped TAD. As used herein, processes such as creping or rush transfer are not considered compactive.

The paper towel as described may be a single, double or triple ply product. According to one embodiment, the paper towel product has a SAT absorbent capacity of at least about 300 g/sq. meter, for example, at least about 400 g/sq. meter, for example, at least about 450 g/sq. meter, for example, at least about 500 g/sq. meter, for example at least about 550 g/sq. meter, for example, from about 550 g/sq. meter to about 600 g/sq. meter.

According to one embodiment, the perpendicular perforations bisect the towel into two equally sized towels. According to another embodiment, the perpendicular perforations can be located to bisect the towel into two towels of unequal size. According to this embodiment, the perpendicular perforations should be located in a manner such that the smaller towel is no less than 3.5 inches in the cross machine direction, for example, not less than 4 inches in the cross machine direction, for example, not less than 4.5 inches in the cross machine direction, for example, not less than 5 inches in the cross machine direction.

In addition to the issues encountered when producing a paper towel product with both a perpendicular perforation and a cross machine direction perforation, the perforation strengths associated with the perforations should be controlled so that in use they produce the consumer desired tear sequence. If the perforation strengths are not within the embodiments disclosed herein, the paper towel won't produce the desired tear of the cross-machine direction full sheet or half sheet before a tear in the machine direction quarter sheet occurs.

Commercial paper production is carried out using either a target value or a range of values for each of the attributes that are desired in the final production product, to account for slight variations between the attributes of each paper run that can be caused by variations in the actual fiber, the run conditions, and the surrounding environment. Therefore, the process is continuously adjusted to maintain the end product attributes within a range of commercial specifications based upon consumer demands for the intended final product.

Obtaining a product that consistently results in the correct perforation strengths and therefore the correct tear pattern is important for consumer satisfaction. All paper machines show some variability in the properties of the paper that they make. The same is true in converting. All converting operations have a standard deviation. So when perforations are placed into a sheet, the perforation strength in the CD direction might be, for example, 790 g/3 inches with a standard deviation of 85 g/3 inches. If one desires a MD perforation of 950 g/3 inches which itself can have a standard deviation of 100 g/3 inches, the MD perforations and the CD perforations, depending upon the machine upon which they are produced can end up reversing, i.e., the MD perforation at its lowest would be 850 g/3 inches and the CD perforation could be as high as 875 g/3 inches at its highest.

When a consumer uses the rolled paper towel product as described, if the perforation strength is too strong in the machine direction, the towel will not separate easily and will begin to separate along lines of weakness in the sheet causing the separation not to follow the perforation and thereby leaving a tail of unwanted material on one of the two smaller towels.

Napkins

Napkin base sheets that can be used with the perforating techniques as disclosed herein can include any art recognized base sheets. In addition, inclusion of an MD perforation line in a napkin product provides new options for packaging, folding and dispensing napkin products.

The paper napkin product as described is produced to have at least one perpendicular perforation line in the machine direction. Perpendicular perforation lines in the MD direction are produced by applying a perforation including any art recognized series of perforation wheels used in concert. The diameter of the perforation roll is selected to produce the correct repeat perforation lengths. Upon determining the desired perforation tensile, and perforation unit length, the skilled artisan can select an appropriate perforation wheel to generate the appropriate perpendicular perforation pattern. According to one embodiment, typical perforation blades used to produce paper napkin perforations in the MD direction produce perforation lines with a perforation tensile of between about 800 and about 1500 g/3". The perforation blade for producing the perpendicular perforation can have a perforation unit length of from about 3.0 mm to about 6.5 mm with the bond length being from about 0.5 mm to about 0.9 mm and the cut length being from about 2.0 mm to about 6.0 mm.

According to one embodiment, the perpendicular perforation lines in the machine direction have a perforation tensile of between about 550 g/3 inches and 1850 g/3 inches. More particularly, the perpendicular perforation tensile of the perpendicular perforations in the machine direction is from about 750 g/3 inches to about 1700 g/3 inches, for example, 800 g/3 inches to about 1700 g/3 inches, for example, from about 800 g/3 inches to about 1500 g/3 inches, for example, from about 950 g/3 inches to about 1700 g/3 inches.

According to one embodiment, the ratio between the the perforation tensile strength of the perpendicular perforation line in the MD direction and the CD tensile strength of the paper (MD perf tensile ratio) is from about 30% to about 70%, for example from 22 about 30% to about 60%, for example, from about 32% to about 55%, for example, at least about 32%.

The perpendicular perforation lines in the machine direction have a percent bond area of the perforation line of at least about 15%, for example, at least about between 15.5%, for example at least about 19%, for example at least about 22%, for example between about 15% and 30%.

According to one embodiment, the bond length for the MD perforation line, measured linearly in the MD direction, is from about 0.5 mm to about 0.9 mm, for example, from about 0.6 mm to about 0.9 mm, for example, above about 0.6 mm, for example from about 0.6 mm to about 0.8 mm, for example between about 0.65 mm and 0.8 mm.

According to one embodiment, the cut length for the MD perforation line, measured linearly in the MD direction, is above about 2.0 mm, from about 2.0 mm to about 6.0 mm, for example, from about 2.5 mm to about 5.0 mm, for example, between about 2.0 mm and about 3.5, for example less than about 3.5 mm, for example between about 2.0 mm and about 4.5 mm.

According to one embodiment, the ratio of the cut lengths to the bond lengths for the perpendicular perforation line, measured linearly in the MD direction, is less than about 7, for example, less than about 5.0, for example, less than about 4, for example, less than about 3, for example less than about 2.5

According to one embodiment, the cuts within the line of perforations make up at least about 50% of the area of the perforation line, for example, at least about 65% of the perforation line, for example, at least about 70% of the perforation line, for example, at least about 75% of the perforation line, for example, from about 65% to about 85%.

According to one embodiment the CD and MD perforations can be used to produce a napkin product having a basis weight of at least about 35 g/sq. meter, for example, at least about 40 g/sq. meter, for example, at least about 43 g/sq. meter, for example at least about 45 g/sq. meter, for example, at least about 50 g/sq. meter, for example, at least about 55 g/sq. meter. The basis weight of the paper web may affect the perforation tensile.

According to one embodiment, the paper napkin product is made from a paper web that is produced by non-compactive drying. Various method for non-compactive drying are well known in the art include through-air-drying (TAD), UCTAD (uncreped TAD), single or double creped TAD. As used herein, processes such as creping or rush transfer are not considered compactive. According to another embodiment, the napkin is made as by airlaying.

The paper napkin as described may be a single, double or triple ply product. According to one embodiment, the paper napkin product has a SAT absorbent capacity of at least about 300 g/sq. meter, for example, at least about 400 g/sq. meter, for example, at least about 450 g/sq. meter, for example, at least about 500 g/sq. meter, for example at least about 550 g/sq. meter, for example, from about 550 g/sq. meter to about 600 g/sq. meter.

According to one embodiment, the perpendicular perforations bisect the napkin into two equally sized napkins. According to another embodiment, the perpendicular perforations can be located to bisect the napkin into two napkins of unequal size. According to this embodiment, the perpendicular perforations should be located in a manner such that the smaller napkin is not less than ⅓ of the original napkin product, or not less than ¼ of the napkin product. According to another embodiment, at least two MD direction perforations are included on a napkin product. According to this embodiment, the napkin product can be divided into thirds. Based upon the techniques described herein, the skilled artisan could envision means for locating the MD perforation to coincide with a fold line on an existing napkin configuration or locating an MD perforation to divide an existing napkin configuration into a desired end size.

Should the skilled artisan desire to produce a napkin product with both an machine direction perpendicular perforation line and a CD direction perforation line, the discussion above regarding the relative attributes of those two perforation lines, as it applies to paper towels would likewise apply to paper napkins. According to one embodiment, bi-directional perforation lines would be useful if the napkins were a rolled napkin product. The perforations should be controlled so that in use they produce the consumer desired separation sequence.

When a consumer uses the paper napkin product as described, if the perforation strength is too strong in the machine direction, the napkin will not separate easily and will begin to separate along lines of weakness in the sheet causing the separation not to follow the perforation and thereby leaving a tail of unwanted material on one of the two smaller napkins.

Wiper Products

Wiper products can be produced by a variety of different methods including the papermaking processes as described above. In addition, wipers can also be made using any art recognized process including airlaying, spunlacing, spunbonding or other hydroentangling processes. The nonwoven base sheets for use in the disclosed wiper products can be homogenous or layered products, single layer or multi-layer laminates. Any art recognized product for making a wiper base sheet can used with the instantly described method to make perforated products.

Wiper products that can be perforated using the disclosed techniques can include industrial products, including for example, industrial towels and cleaning cloths, wet hand wipes, dry hand wipes or dusting clothes; heathcare wipers, including disposable washcloths, disposable bath towels, cleaning wipers and cloths, hygienic wipers, baby wipes, and surface cleaning systems; foodservice wipers including napkins, table wipers, bar and food preparation station wipers, hygienic wipers, wet or dry hand wipers, deli papers, sandwich papers, bakery papers, butcher paper, meat or freezer paper. The foregoing list is not exhaustive and other wiper products will apparent to the skilled artisan.

The wiper product as described can include any art recognized solutions or may be impregnated with compositions for cleaning, softening, sanitizing, and the like. For example, the wipers may include aqueous compositions, soap composition, cleaning solutions, lotions, antibacterial compositions and/or antiviral compositions. The materials included with the absorbent base sheet may be in the form of fluids, emulsions, or suspensions and the final products may be dry or pre-moistened.

The wiper product as described is produced to have at least one perforation in the machine direction. The inclusion of the MD direction perpendicular perforation allows new and interesting dispensers to be used for the wiper products as described above.

According to one embodiment, the wiper products as disclosed have perforation lines in the cross machine direction, as well as, at least one perpendicular perforation line in the machine direction. Perforation lines in the CD direction are well understood in the art and can be made using any art recognized perforation blade(s). Typical perforation blades used to produce wiper perforations in the CD direction produce perforation lines with a perforation tensile of between about 600 and about 950 g/3". One typical perforation blade used to produce commercial wiper products has a perforation unit length from about 3.5 to about 3.9 mm, for example, about 3.7 mm, with 0.6 mm being the bond length, and 3.1 mm being the cut length.

Perpendicular perforation lines in the MD direction are produced by a system including perforation wheels either before or after the perforation unit that produces CD perforations. Selection of an appropriate perforation wheel is discussed above. According to one embodiment, typical perforation blades used to produce wiper perforations in the MD direction produce perforation lines with a perforation tensile of between about 800 and about 1500 g/3". The perforation blade for producing the perpendicular perforation can have a perforation unit length of from about 3.0 mm to about 6.5 mm with the bond length being from about 0.5 mm to about 0.9 mm and the cut length being from about 2.0 mm to about 6.0.

According to one embodiment, the perforation lines in the cross machine direction have a percent bond area of the perforation line of at least about 15%, for example, at least about 16%, for example, between about 15.5% and about 16.5%, for example between about 16% and about 16.5%, for example between about 16% and about 16.3%.

The perpendicular perforation lines in the machine direction have a percent bond area of the perforation line of at least about 15%, for example, at least about between 15.5%, for example at least about 19%, for example at least about 22%, for example between about 15% and about 30%.

According to one embodiment, the perforation lines in the cross machine direction have a perforation tensile of between about 450 g/3 inches and about 950 g/3 inches. More particularly, the perforation tensile is from about 450 g/3 inches to about 800 g/3 inches, for example, from about 500 g/3 inches to about 950 g/3 inches, for example, from about 600 g/3 inches to about 950 g/3 inches, for example, from about 750 g/3 inches to about 950 g/3 inches, for example, from about 850 g/3 inches to about 950 g/3 inches.

According to one embodiment, the perpendicular perforation lines in the machine direction have a perforation tensile of between about 770 g/3 inches and 1700 g/3 inches. More particularly, the perpendicular perforation tensile of the perpendicular perforations in the machine direction is from about 750 g/3 inches to about 1700 g/3 inches, for example, 800 g/3 inches to about 1700 g/3 inches, for example, from about 800 g/3 inches to about 1500 g/3 inches, for example, from about 950 g/3 inches to about 1700 g/3 inches. According to one embodiment, in order to achieve the proper separation sequence, the perforation strength of the perpendicular perforation tensile in the MD direction is greater than the perforation tensile in the CD direction.

The ratio of the perpendicular perforation tensile to the CD perforation tensile can be between about 0.9 and about 1.7, for example, between about 1.0 and between about 1.5, for example from about 1.0 to about 1.2.

According to one embodiment, the ratio between the perforation tensile strength of the perforation line in the CD direction and the MD tensile strength of the paper (CD perf tensile ratio) is from about 30% to about 40%, for example from about 32% to about 38%, for example, from about 32% to about 36%, for example, at least about 32%.

According to one embodiment, the ratio between the perforation tensile strength of the perpendicular perforation line in the MD direction and the CD tensile strength of the paper (MD perf tensile ratio) is from about 30% to about 60%, for example from about 30% to about 50%, for example, from about 32% to about 55%, for example, at least about 32%.

The ratio of the perpendicular perforation ratio to the perforation ratio can be between about 1.0 and about 2.0, for example, between about 1.0 and between about 1.8, for example from about 1.0 to about 1.7.

According to one embodiment, the bond length for the CD perforation line, measured linearly in the CD direction, is from about 0.5 mm to about 0.75 mm, for example, from about 0.5 mm to about 0.6 mm, for example, above about 0.5 mm, for example about 0.6 mm, for example between about 0.6 mm and about 0.7 mm.

According to one embodiment, the bond length for the MD perforation line, measured linearly in the MD direction, is from about 0.5 mm to about 0.9 mm, for example, from about 0.6 mm to about 0.9 mm, for example, above about 0.6 mm, for example from about 0.6 mm to about 0.8 mm, for example between about 0.65 mm and 0.8 mm.

According to one embodiment, the cut length for the CD perforation line, measured linearly in the CD direction, is from about 2.5 mm to about 3.5 mm, for example, from about 3.0 mm to about 3.5 mm, for example, above about 3.0 mm, for example about 3.1 mm, for example between about 3.0 mm and about 3.3 mm.

According to one embodiment, the cut length for the MD perforation line, measured linearly in the MD direction, is above about 2.0 mm, from about 2.0 mm to about 6.0 mm, for example, from about 2.5 mm to about 5.0 mm, for example, between about 2.0 mm and about 3.5, for example less than about 3.5 mm, for example between about 2.0 mm and about 4.5 mm.

While not exemplified, other embodiments are contemplated that achieve the desired relative perforation strengths between the machine direction perpendicular perforation line and the CD perforation line. While perforation lines are typically made up of a series of homogeneous perforations, irregular perforation lines are contemplated for use herein. The perforation line may be made up of different segments having varying perforation unit length, different bond lengths and/or different cut lengths. If one wanted to improve the strength of the MD perforation line in the area proximate the CD perforation line, one could use longer bonds for the MD perforations in the area proximate the intersection.

According to one embodiment, the ratio of the cut lengths to the bond lengths for the CD perforation line, measured linearly in the CD direction, is greater than about 3, for example, greater than about 3.5, for example, greater than about 4, for example, greater than about 4.5, for example, greater than about 8.

According to one embodiment, the ratio of the cut lengths to the bond lengths for the perpendicular perforation line, measured linearly in the MD direction, is less than about 7, for example, less than about 5.0, for example, less than about 4, for example, less than about 3, for example less than about 2.5

According to one embodiment, the individual perforations of the perpendicular perforation line in the MD direction are longer than the individual perforations in the CD direction. According to another embodiment, the individual perforations of the perpendicular perforation line in the MD direction are shorter than the individual perforations in the CD direction. Finally, according to still another embodiment, the individual perforations of the perpendicular perforation line in the MD direction are the same length as the individual perforations in the CD direction and according to this embodiment, the cut and bond lengths in the MD perpendicular perforation line may be the same or different from the cut and bond lengths in the CD perforation line.

According to one embodiment, the ratio of the length of an individual perpendicular perforation in the MD direction to the length of an individual perforation in the CD direction is at least about 1.1, for example, at least about 1.2, for example, at least about 1.3, for example, at least about 1.4, for example, at least about 1.5, for example, at least about 1.6, for example, at least about 1.7, for example, at least about 1.9.

According to one embodiment, the perforations in the CD direction have smaller bonds than the perpendicular perforations in the MD direction. According to one embodiment, the bonds in the MD direction are 1.1 to 1.5 times the length of the bonds in the CD direction.

According to one embodiment, the cuts within the line of perforations make up at least about 50% of the area of the perforation line, for example, at least about 65% of the perforation line, for example, at least about 70% of the perforation line, for example, at least about 75% of the perforation line, for example, from about 65% to about 85%.

According to one embodiment the CD and MD perforations can be used to produce a wiper product having a basis weight of at least about 20 g/sq. meter, for example, at least about 25 g/sq. meter, for example, at least about 30 g/sq. meter, for example at least about 35 g/sq. meter, for example between about 20 g/sq. meter and about 40 g/sq. meter, for example between about 25 g/sq. meter and about 45 g/sq. meter. The basis weight of the paper web may affect the perforation tensile.

According to one embodiment, the wiper product has a SAT absorbent capacity of at least about 300 g/sq. meter, for example, at least about 400 g/sq. meter, for example, at least about 450 g/sq. meter, for example, at least about 500 g/sq. meter, for example at least about 600 g/sq. meter, for example, from about 500 g/sq. meter to about 1300 g/sq. meter, for example from about 700 to about 1000 g/sq. meter, for example from about 750 to about 1250 g/sq. meter, depending upon the type of wiper product that is desired.

According to one embodiment, the perpendicular perforations bisect the wiper into two equally sized wipers. According to another embodiment, the perpendicular perforations can be located to bisect the wiper into two wipers of unequal size. According to this embodiment, the perpendicular perforations should be located in a manner such that the smaller wiper is not less than ⅓ of the original wiper product, or not less than ¼ of the wiper product. According to another embodiment, at least two MD direction perforations are included on a wiper product. According to this embodiment, the wiper product can be divided into thirds. Based upon the techniques described herein, the skilled artisan could envision means for locating the MD perforation to coincide with a fold line on an existing wiper configuration or locating an MD perforation to divide an existing wiper configuration into a desired end size.

In addition to the issues encountered when producing the wiper product with both a perpendicular perforation and a cross machine direction perforation, the perforation strengths associated with the perforations should be controlled so that in use they produce the consumer desired separation sequence.

When a consumer uses the wiper product as described, if the perforation strength is too strong in the machine direction, the wiper will not separate easily and will begin to separate along lines of weakness in the airlaid sheet causing the separation not to follow the perforation and thereby leaving a tail of unwanted material on one or both of the smaller wipers.

Other Products

While the embodiments as described above relate to standard configurations for commercial products, the same technique of providing perforations in multiple directions having differing tear strengths can be applied to a variety of other fibrous products. Products that can benefit from the perforation method as described include products made by any art recognized method of forming a paper sheet, for example, wet laying or, air laying. Other products that can benefit from the process as described include but are not limited to air filters, gas filters, wallcoverings, vacuum cleaner bags, cleaning wipes, acoustic insulation, embroidery stabilizers, to name a few.

According to one embodiment, the process as described can be applied to stabilizer for use in the production of embroidery. Stabilizers are used to improve stitch quality. Stabilizers are essentially fibrous products that are formed using the same techniques that are described above for tissue and wipers. Stabilizers are especially important with dense embroidery but also to prevent puckering and tunneling when satin stitching. Each type of stabilizer (except for heat-away) comes in several weights or thicknesses. Thicker, heavier stabilizers are used for the densest stitching and lighter weights for lighter stitching. Stabilizers are generally characterized by their means of removal. There are four basic type of machine embroidery stabilizers:

Tear away: This stabilizer is used as a general backing to improve stitch quality when doing applique or embroidery. Like all stabilizers, it helps prevent puckers from dense stitching and tunneling when using a wide zig-zag, satin stitch or other programmed stitches. The tear away stabilizer is placed on the wrong side of the background fabric and decorative stitching is applied with the stabilizer in place. Tear-away can be removed after the stitching is completed. Tear-away stabilizers often look like thin interfacing, and can be found in different weights for various uses. Tear away stabilizers are often made of rayon (e.g., 100% rayon 806 Stitch-N-Tear Pellon® brand distributed by PCP Group, LLC (Pellon® Consumer Products) in Saint Petersburg, Fla.); wet laid short (0.25 to 0.5 inch) polyester fibers; cellulose (e.g. 100% cellulose Pellon® 2301 Print-Stitch-Dissolve™); polypropylene (e.g., 100% polypropylene Pellon® 360 EZ-Stitch® is a non-woven, perforated, lightweight stabilizer) or polyester/cellulose blends such as 70% Polyester/30% Cellulose sold as Pellon® 835 Stitch-N-Tear® Lite lightweight embroidery stabilizer or Pellon® 841 Stick-N-Tear that also contains a pressure sensitive adhesive).

Cut Away: This type of stabilizer is used for dense machine programmed stitching. The stabilizer remains under the stitching, but can be cut away from around the design. Cut-away types are usually heavy and are used to back applique or embroidery on garments. They can be produced from polyester fibers (typically over 0.5 inches/15 denier) (e.g. 100% polyester Pellon® Ultra-Weave™ fusible embroidery stabilizer) or polyester/viscose blends (e.g., 85% Polyester/15% Viscose such as Fusible e.g., Pellon® 200BX Tack-n-Fuse™ non-woven stabilizer with a pressure-sensitive back on one side and a fusible on the other.); and nylon (e.g. 100% nylon Pellon® 380 Soft-N-Stay™ lightweight, sew-in stabilizer).

Wash Away: This stabilizer dissolves completely in water. It is used for open work embroidery, needle lace and free-standing thread painted objects. It is the stabilizer of choice when every bit of the stabilizer should disappear. Completely dissolvable stabilizers are used to lay on top of piled fabrics like towels before embroidery. This allows the embroidery design sit on top of the surface instead of sinking into the surface.

The materials used to produce these wash away stabilizers include cellulose (e.g. 100% Cellulose Mixture Paper Wooden Pulp from, Pellon® 2301 Print-Stitch-Dissolve™ stabilizer), PVA, (e.g. 100% polyvinyl alcohol Pellon® 541 Wash-N-Gone® lightweight embroidery stabilizer; Pellon 542 Stick-N-Washaway™ with pressure sensitive adhesive or Pellon 551 Sol-U-Film™ or Pellon® 553 Sol-U-Film™ Lite). Other providers of wash away stabilizers include Sulky of America, Kennesaw, Ga. (Solvy brand), Superior Threads of St. George, Utah (Dissolve brand), VSM Group AB, Huskvarna, Sweden (INSP IRA® Aqua Magic Plus brand).

Heat Away: It is used when fabrics or thread are water-sensitive but can tolerate heat. It will disintegrate completely when heated with an iron. This type of stabilizer is often called "Vanishing Muslin". In appearance it looks like a very loosely woven but stiff muslin or heavy, stiff cheesecloth. (e.g., remove using dry iron setting of 260°-300° F. (120°-140° C.), such as Sulky Heat-Away Stabilizer—Clear Film from Sulky of America).

According to one embodiment, embroidery stabilizers can be produced with perforations that can be in the machine direction to allow the user to separate the stabilizer into smaller segments thereby retaining a portion of the stabilizer for later use. Again, this allows the consumer to use the lowest and most ecologically friendly amount. According to another embodiment, the embroidery stabilizer can be produced with perforation in both the cross direction and in the perpendicular machine direction. According to this embodiment, the perforations may be consistent with those discussed above for any of the towel, napkin or wiper depending upon the weight and characteristics of the product to the perforated.

Regardless of the type of stabilizer being used, the combination of machine and cross direction perforations as described will allow the stabilizer to be produced in a size that can accommodate the largest of embroidery hoops, which stabilizer may be separated along perforation so that will prevent material waste when the hoop being used is smaller. As discussed above, the tear strength of the material in the machine and cross direction will have to be developed so that the material will not separate at the perforation lines during use of a larger stabilizer.

According to one embodiment, the stabilizers as described can be used with any art recognized hoop. For example, manufacturers of consumer embroidery machines include Husqvarna Viking (VSM Group AB, Huskvarna, Sweden), Pfaff (SGSB Co. Ltd., Kaiserslautern Germany), Bernina (The Bernina Company, Steckborn, Switzerland), Brother (Brother International, Bridgewater, N.J., USA), and Janome (Janome Sewing Machine Co., Ltd, Tokyo, Japan). Hoop dimensions offered by machine embroidery machine manufacturers can range 40 mm×40 mm to the more common hoop dimensions including 360 mm×360 mm, 200 mm×200 mm, 100 mm×100 mm. The stabilizer as described herein, can for example by made at 360 mm by 360 mm, or 400 mm×400 mm, with perforated at lines every 40 mm in both the machine and the cross direction. This perforated stabilizer will allow the consumer to subdivide the stabilizer for use in 40 mm×40 mm, 200 mm×200 mm and 360 mm×360 mm hoops.

The product characteristics as set forth infra, and as measured in the Examples, used the following methodologies. Throughout this specification and claims, it is to be understood that, unless otherwise specified, physical properties are measured after the web has been conditioned according to TAPPI standards. If no test method is explicitly set forth for measurement of any quantity mentioned herein, it is to be understood that TAPPI standards should be applied.

Basis Weight

Unless otherwise specified, "basis weight", BWT, bwt, BW, and so forth, refers to the weight of a 3000 square-foot ream of product (basis weight is also expressed in g/m² or gsm). Likewise, "ream" means a 3000 square-foot ream, unless otherwise specified. Likewise, percent or like terminology refers to weight percent on a dry basis, that is to say, with no free water present, which is equivalent to 5% moisture in the fiber.

Caliper

Calipers and/or bulk reported herein may be measured at 8 or 16 sheet calipers as specified. The sheets are stacked and the caliper measurement taken about the central portion of the stack. Preferably, the test samples are conditioned in an atmosphere of 23°±1.0° C. (73.4°±1.8° F.) at 50% relative humidity for at least about 2 hours and then measured with a Thwing-Albert Model 89-II-JR or Progage Electronic Thickness Tester with 2-in diameter anvils, 539±10 grams dead weight load, and 0.231 in/sec descent rate. For finished product testing, each sheet of product to be tested must have the same number of plies as the product as sold. For testing in general, eight sheets are selected and stacked together. For towel testing, towels are unfolded prior to stacking. For base sheet testing off of winders, each sheet to be tested must have the same number of plies as produced off of the winder. For base sheet testing off of the papermachine reel, single plies must be used. Sheets are stacked together aligned in the machine direction (MD). Bulk may also be expressed in units of volume/weight by dividing caliper by basis weight.

MD and CD Tensile. Stretch. Break Modulus and TEA

Dry tensile strengths (MD and CD), stretch, ratios thereof, modulus, break modulus, stress and strain are measured with a standard Instron test device or other suitable elongation tensile tester, which may be configured in various ways, typically, using 3 inch or 1 inch wide strips of tissue or towel, conditioned in an atmosphere of 23°±1° C. (73.4°±1° F.) at 50% relative humidity for 2 hours. The tensile test is run at a crosshead speed of 2 in/min. Break modulus is expressed in grams/3 inches/% strain or its SI equivalent of g/mm/% strain. % strain is dimensionless and need not be specified. Unless otherwise indicated, values are break values. GM refers to the square root of the product of the MD and CD values for a particular product. Tensile energy absorption (TEA), which is defined as the area under the load/elongation (stress/strain) curve, is also measured during the procedure for measuring tensile strength. Tensile energy absorption is related to the perceived strength of the product in use. Products having a higher TEA may be perceived by users as being stronger than similar products that have lower TEA values, even if the actual tensile strength of the two products are the same. In fact, having a higher tensile energy absorption may allow a product to be perceived as being stronger than one with a lower TEA, even if the tensile strength of the high-TEA product is less than that of the product having the lower TEA. When the term "normalized" is used in connection with a tensile strength, it simply refers to the appropriate tensile strength from which the effect of basis weight has been removed by dividing that tensile strength by the basis weight. In many cases, similar information is provided by the term "breaking length".

GMT refers to the geometric mean tensile strength of the CD and MD tensile. Tensile energy absorption (TEA) is measured in accordance with TAPPI test method T494 om-01.

Tensile ratios are simply ratios of an MD value determined by way of the foregoing methods divided by the corresponding CD value. Unless otherwise specified, a tensile property is a dry sheet property.

Pert Tensile

The perforation tensile strength (force per unit width required to break a specimen) is measured generally using a constant rate of elongation tensile tester equipped with 3-in wide jaw line contact grips. Typically, the test is carried out using 3 inch wide by 5 inch long strips of tissue or towel, conditioned in an atmosphere of 23°±1° C. (73.4°±1° F.) at 50% relative humidity for 2 hours. The crosshead speed of the tensile tester is generally set to 2.0 in. per minute. The jaw span is 3 inches. The specimen is clamped into the upper grip and allowed to hang freely. The lower grip is then used to grip the free end of the specimen tightly enough to hold the sample, but not with sufficient pressure to damage the sample. The sample is stretched until it breaks and the perforation tensile is recorded.

Wet Tensile

The wet tensile of the tissue of the present invention is measured generally following Technical Association of the Pulp and Paper Industry (TAPPI) Method T 576 pm 7, using a three-inch (76.2 mm) wide strip of tissue that is folded into a loop, clamped in a special fixture termed a Finch Cup, then immersed in water. A suitable Finch cup, 3-in., with base to fit a 3-in. grip, is available from:

High-Tech Manufacturing Services, Inc.
3105-B NE 65th Street
Vancouver, Wash. 98663
360-696-1611
360-696-9887 (FAX).

For fresh basesheet and finished product (aged 30 days or less for towel product, aged 24 hours or less for tissue product) containing wet strength additive, the test specimens are placed in a forced air oven heated to 105° C. (221° F.) for five minutes. No oven aging is needed for other samples. The Finch cup is mounted onto a tensile tester equipped with a 2.0 pound load cell with the flange of the Finch cup clamped by the tester's lower jaw and the ends of tissue loop clamped into the upper jaw of the tensile tester. The sample is immersed in water that has been adjusted to a pH of 7.0±0.1 and the tensile is tested after a 5 second immersion time using a crosshead speed of 2 inches/minute. The results are expressed in g/3 in., dividing the readout by two to account for the loop as appropriate.

Roll Compression

Roll compression is measured by compressing a roll under a 1500 g flat platen of a test apparatus. Sample rolls are conditioned and tested in an atmosphere of 23.0°±1.0° C. (73.4°±1.8° F.). A suitable test apparatus with a movable 1500 g platen (referred to as a height gauge) is available from:

Research Dimensions
1720 Oakridge Road
Neenah, Wis. 54956
920-722-2289
920-725-6874 (FAX).

The test procedure is generally as follows:

(a) Raise the platen and position the roll to be tested on its side, centered under the platen, with the tail seal to the front of the gauge and the core parallel to the back of the gauge.
(b) Slowly lower the platen until it rests on the roll.
(c) Read the compressed roll diameter or sleeve height from the gauge pointer to the nearest 0.01 inch (0.254 mm).
(d) Raise the platen and remove the roll.
(e) Repeat for each roll or sleeve to be tested.

To calculate roll compression (RC) in percent, the following formula is used:

$$RC(\%) = \frac{100 \times (\text{initial roll diameter} - \text{compressed roll diameter})}{\text{initial roll diameter}}$$

SAT Capacity

Absorbency of the inventive products is measured with a simple absorbency tester. The simple absorbency tester is a particularly useful apparatus for measuring the hydrophilicity and absorbency properties of a sample of tissue, towels, or towel. In this test a sample of tissue, towels, or towel 2.0 inches in diameter is mounted between a top flat plastic cover and a bottom grooved sample plate. The tissue, towel, or towel sample disc is held in place by a ⅛ inch wide circumference flange area. The sample is not compressed by the holder. De-ionized water at 73° F. is introduced to the sample at the center of the bottom sample plate through a 1 mm. diameter conduit. This water is at a hydrostatic head of minus 5 mm. Flow is initiated by a pulse introduced at the start of the measurement by the instrument mechanism. Water is thus imbibed by the tissue, towel, or towel sample from this central entrance point radially outward by capillary action. When the rate of water imbibation decreases below 0.005 gm water per 5 seconds, the test is terminated. The amount of water removed from the reservoir and absorbed by the sample is weighed and reported as grams of water per square meter of sample or grams of water per gram of sheet. In practice, an M/K Systems Inc. Gravimetric Absorbency Testing System is used. This is a commercial system obtainable from M/K Systems Inc., 12 Garden Street, Danvers, Mass., 01923. WAC, or water absorbent capacity, also referred to as SAT, is actually determined by the instrument itself. WAC is defined as the point where the weight versus time graph has a "zero" slope, i.e., the sample has stopped absorbing. The termination criteria for a test are expressed in maximum change in water weight absorbed over a fixed time period. This is basically an estimate of zero slope on the weight versus time graph. The program uses a change of 0.005 g over a 5 second time interval as termination criteria; unless "Slow SAT" is specified in which case the cut off criteria is 1 mg in 20 seconds.

Water absorbency rate is measured in seconds and is the time it takes for a sample to absorb a 0.1 gram droplet of water disposed on its surface by way of an automated syringe. The test specimens are preferably conditioned at 23° C.±1° C. (73.4° F.±1.8° F.) at 50% relative humidity. For each sample, 4 3×3 inch test specimens are prepared. Each specimen is placed in a sample holder such that a high intensity lamp is directed toward the specimen. 0.1 ml of water is deposited on the specimen surface and a stop watch is started. When the water is absorbed, as indicated by lack of further reflection of light from the drop, the stopwatch is stopped and the time recorded to the nearest 0.1 seconds. The procedure is repeated for each specimen and the results averaged for the sample. SAT Rate is determined by graphing the weight of water absorbed by the sample (in grams) against the square root of time (in seconds). The SAT rate is the best fit slope between 10 and 60 percent of the end point (grams of water absorbed).

Sensory Softness

Sensory softness of the samples was determined by using a panel of trained human subjects in a test area conditioned to TAPPI standards (temperature of 71.2° F. to 74.8° F., relative humidity of 48% to 52%). The softness evaluation relied on a series of physical references with predetermined softness values that were always available to each trained subject as they conducted the testing. The trained subjects directly compared test samples to the physical references to determine the softness level of the test samples. The trained subjects assigned a number to a particular paper product, with a higher sensory softness number indicating a higher the perceived softness

EXAMPLES

Example 1

A tear-a-square product was produced by converting two paper webs into a towel product. The towel was embossed and perforated using a converting line. The towel rolls were perforated in both the CD direction and in the perpendicular MD direction using a standard CD perforation pattern according to the description in Table 1.

TABLE 1

Trial cell perf blade and perf wheel designs and the Target MD/CD Perf Tensile Ratios.

| Trial Cell ID | Target MD/CD Perf Tensile Ratio | CD Bond Length | CD Cut Length | CD % Bond | Number of Teeth | MD Bond Length | MD Cut Length | MD % Bond |
|---|---|---|---|---|---|---|---|---|
| P2.1 | 0.8 | 0.6 mm | 3.1 mm | 16.2% | 83 | 0.71 mm | 5.06 mm | 12.3% |
| P2.2 | 1.1 | 0.6 mm | 3.1 mm | 16.2% | 116 | 0.71 mm | 3.42 mm | 17.2% |
| P2.3 | 1.3 | 0.6 mm | 3.1 mm | 16.2% | 125 | 0.79 mm | 3.04 mm | 17.6% |
| P2.4 | 1.5 | 0.6 mm | 3.1 mm | 16.2% | 152 | 0.79 mm | 2.36 mm | 25.0% |
| P2.5 | 1.8 | 0.6 mm | 3.1 mm | 16.2% | 156 | 0.8 mm | 2.18 mm | 29.0% |

Example 2

Five tear-a-square sample products were produced by converting two paper webs into a towel product. The towel was embossed and perforated using a converting line. The five sample products differed only by the ratio of MD perf/CD perf. In addition a sixth sample was produced having the same properties as the five samples except the length of the sheet was shortened to 5.5, which is the same sheet size as a ¼ sheet of commercial BRAWNY® towel. The samples were perforated in accordance with the information presented in Table 1.

The perpendicular MD perforations were produced using a hardened steel wheel cut to leave teeth that when pressed against a hardened anvil roll perforated the moving tissue web to provide cuts in the paper. The distance between cuts is the bond length for the paper towel product. In order to change the bond length, the number of perforations had to change and/or length of the cut had to change, and/or the size of the wheel had to change.

The towel rolls were perforating in both the CD direction and in the perpendicular MD direction according to the description in Table 1. The five towels samples were produced with different perforation strengths and different perforation ratios as set forth in Table 2.

TABLE 2

Perf Strength and Perf Ratios

| Sample No. | P2.1 | P2.2 | P2.3 | P2.4 | P2.5 |
|---|---|---|---|---|---|
| Perf Tensile (g/3 inches) | 889 | 878 | 922 | 912 | 895 |
| MD Tensile (g/3 inches) | 2714 | 2685 | 2530 | 2668 | 2606 |
| Perf Tensile Ratio (%) | 32.8 | 32.7 | 36.4 | 34.2 | 34.3 |
| Perpendicular Perf Tensile (g/3 inches) | 823 | 972 | 1099 | 1285 | 1410 |
| CD Tensile (g/3 inches) | 2522 | 2491 | 2497 | 2470 | 2387 |
| Perpendicular Perf Tensile Ratio (%) | 32.6 | 39.0 | 44.0 | 52.0 | 59.1 |
| Perpendicular Perf Tensile/Perf Tensile | 0.93 | 1.11 | 1.19 | 1.41 | 1.58 |
| Perpendicular Perf Ratio/Perf Ratio | 1.00 | 1.19 | 1.21 | 1.52 | 1.72 |

As seen from Table 2, the perpendicular perf tensile varied from 7% less to 58% greater than the perf tensile. Further, the ratio of the perpendicular perf tensile to the ratio of the perf tensile ranged from about equal to 72% greater. This ratio is an attribute that is associated with the dispensability of the product.

Physical attributes of the samples are set forth in Table 3, below.

TABLE 3

"Tear-a-Square" Towel Finished Product Physical Attributes

| | Cell ID | | | | | |
|---|---|---|---|---|---|---|
| | P2.1 | P2.2 | P2.3 | P2.4 | P2.5 | P2.6 |
| Basis Weight (lb./3000 sq. foot) | 31.1 | 31.1 | 31.1 | 31.0 | 31.0 | 30.6 |
| Caliper (mils/8 sheets) | 225 | 226 | 229 | 227 | 222 | 216 |
| MD Tensile (g/3 inches) | 2714 | 2685 | 2530 | 2668 | 2606 | 2802 |
| MD Stretch (%) | 15.8 | 15.3 | 15.0 | 15.5 | 15.5 | 15.2 |
| CD Tensile (g/3 inches) | 2522 | 2491 | 2497 | 2470 | 2387 | 2474 |
| CD Stretch (%) | 8.1 | 7.8 | 7.9 | 8.0 | 8.1 | 8.0 |
| Perpendicular Perf Tensile (g/3 inches) | 823 | 972 | 1099 | 1285 | 1410 | 1173 |
| Perf Tensile (g/3 inches) | 889 | 878 | 922 | 912 | 895 | 931 |
| CD Wet Tensile-Finch (g/3 in) | 710 | 711 | 679 | 728 | 693 | 691 |
| SAT Capacity (g/sq meter) | 581 | 580 | 599 | 580 | 584 | 559 |
| GMBreakModulus (g/% stretch) | 231 | 236 | 231 | 230 | 223 | 240 |
| Sheet Count (per roll) | 117 | 117 | 117 | 117 | 117 | 117 |
| Sheet Length (inches) | 6.0 | 6.0 | 6.0 | 6.0 | 6.0 | 5.5 |
| Roll Diameter (inches) | 5.69 | 5.69 | 5.69 | 5.69 | 5.71 | 5.26 |
| Roll Compression (%) | 13.7 | 13.0 | 12.6 | 11.1 | 13.6 | 11.2 |
| Sensory Softness (PSU) | 6.3 | 6.3 | 6.4 | 6.1 | 6.5 | 6.1 |

Home use test of the five sample products were carried out to ascertain consumer response to the smaller size, increased selection, softness, dispensability, etc. The results were reported as an overall performance rating. Products were all within the same general specification except for the ratio of perpendicular perf tensile/perf tensile. Products having a ratio of perpendicular perf tensile/perf tensile greater than about 1.15 were more readily accepted by consumers. Products having ratio of greater than about 1.4 had an overall acceptance rating of higher than 88%. Products having a ratio of greater than about 1.5 had an overall acceptance rating of higher than 89%. The paper towel product as described may have a ratio of perpendicular perf tensile/perf tensile from about 1.15 to about 1.6 including all sub-ranges in between including those having either endpoint chosen from 1.15, 1.2, 1.25, 1.3, 1.35, 1.4, 1.45, 1.5, 1.55 and 1.6. The products samples were submitted for home-use-test for dispensability evaluations.

Other embodiments of the present invention can include alternative variations. These and other variations and modifications will become apparent to those skilled in the art once the above disclosure is fully appreciated. It is intended that the following claims be interpreted to embrace all such variations and modifications.

What is claimed is:

1. A partitionable paper product of at least one paper web, comprising:
   a basis weight of at least about 20 g/sq. meter;
   least one perforation line in the CD direction having a perforation strength and wherein the perforation strength is between about 450 grams/3 inches and about 950 grams/3 inches;
   at least one perforation line in the MD direction having a perforation strength and wherein the perforation strength of the perpendicular perforation line is between about 300 grams/3 inches and about 1700 grams/3 inches;
   wherein the perforation strength in the MD direction is greater than the perforation strength in the CD direction; and
   wherein the ratio of the tensile strength of the MD perforation line to the CD tensile strength of the paper is from about 30% to about 70%.

2. The paper product of claim 1, wherein the ratio of the tensile strength of the CD perforation line to the MD tensile strength of the paper is from about 30% to about 40%.

3. The paper product of claim 1, wherein the paper product is a folded paper product.

4. The paper product of claim 1, wherein the paper product is a rolled paper product.

5. The paper product of claim 1, wherein the SAT absorbent capacity is at least about 300 grams/sq. meter.

6. The paper product of claim 1, wherein the MD perforation line comprises a cut length of at least about 2.0 mm.

7. The paper product of claim 1, wherein the MD perforation line comprises a bond length of at least about 0.5 mm.

8. The paper product of claim 1, wherein the cuts make up at least about 50% of the length of the MD perforation line.

* * * * *